July 28, 1959  J. T. WARZYBOK ET AL  2,896,524
RAPID FOCUS CHANGER FOR CAMERA
Filed Dec. 2, 1955  2 Sheets-Sheet 1

Julius T. Warzybok
Emil J. Nehila, Jr
INVENTORS

BY *[signatures]*
Attorneys

July 28, 1959     J. T. WARZYBOK ET AL     2,896,524
RAPID FOCUS CHANGER FOR CAMERA
Filed Dec. 2, 1955     2 Sheets-Sheet 2
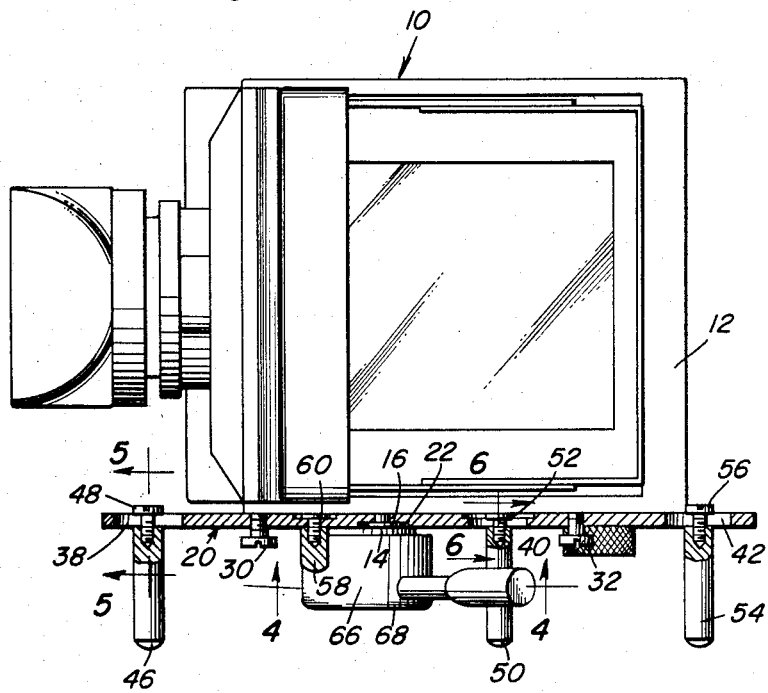
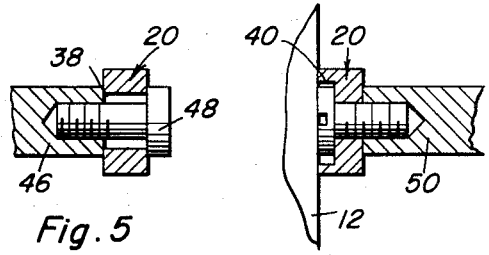
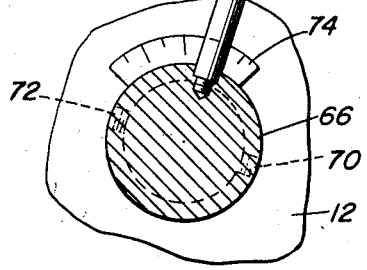
Julius T. Warzybok
Emil J. Nehila, Jr.
INVENTORS

2,896,524
RAPID FOCUS CHANGER FOR CAMERA

Julius T. Warzybok and Emil J. Nehila, Jr.,
Perth Amboy, N.J.

Application December 2, 1955, Serial No. 550,694

6 Claims. (Cl. 95—45)

This invention relates to camera attachments and particularly to an attachment for rapidly changing the focus of a camera while it is in use.

Some cameras have a manual adjustment for the focus which requires accurate adjustment for optimum performance. In one type of camera the viewing screen is approximately as large as the image which is to appear on the film. Therefore, the view finder is mechanically connected with the lens adjustment so that adjustment of the lens results in a corresponding adjustment of the view finder. An object of the present invention is to provide an attachment on such a camera, although the attachment may be fitted on other cameras, which attachment has means for adjusting the focus knob, the focus knob adjusting means being limited in its travel by stops which are themselves adjustable in order to have at the camera operator's disposal a rapidly operable system for adjusting his camera focus between predetermined limits.

A more specific object of the invention is to provide a camera attachment which has adjustable stops that may be set for the farthest and closest positions to be photographed whereby the user of the camera may rapidly adjust the focus between these limits without fear of overtravel in either direction.

Another object of the invention is to provide a camera attachment as described above wherein the stops may be not only quickly loosened and tightened but they may be quickly displaced to new positions depending upon the distance change of the film plane or planes selected by the photographer.

A further object of the invention is to provide means on the camera for limiting the travel of a focus adjustment device by the addition of a mechanically simplified device, this device requiring no alteration to the original camera equipment inasmuch as all original equipment is used and the attachment is simply placed thereon in addition to it.

When a photographer has a rapidly moving event that is confined to a specific area as the subject to be photographed, the focus adjustment travels only through a predetermined range. For example a boxing match presents such a situation. Assuming a professional photographer to be at ringside, with the attachment to the camera he may set a center indicator for the intermediate distance that is approximately 13 feet to the center of the ring. Then one stop is set to correspond to the photographing plane nearest to the photographer, for example 6 feet distance. Then another stop is set for the farthest distance, that is the opposite side of the ring and this will be about 20 feet. Now, the contestants will always be in focus by moving the focus knob the restricted distance between the stops. Accordingly, the photographer need not concentrate on focusing the camera but rather, the majority of his attentions may be placed on the activities of the contestants. The photographer knows that so long as he remains within the limits set up by the stops, he is very close to proper adjustment of his camera.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a top view of the camera in Figure 1, portions being shown in section to illustrate the detail of the attachment;

Figure 4 is an enlarged sectional view taken on the plane of line 4—4 of Figure 2;

Figure 5 is an enlarged detail taken on the line 5—5 of Figure 2; and

Figure 6 is an enlarged sectional view taken on the plane of line 6—6 of Figure 2.

Figure 1:
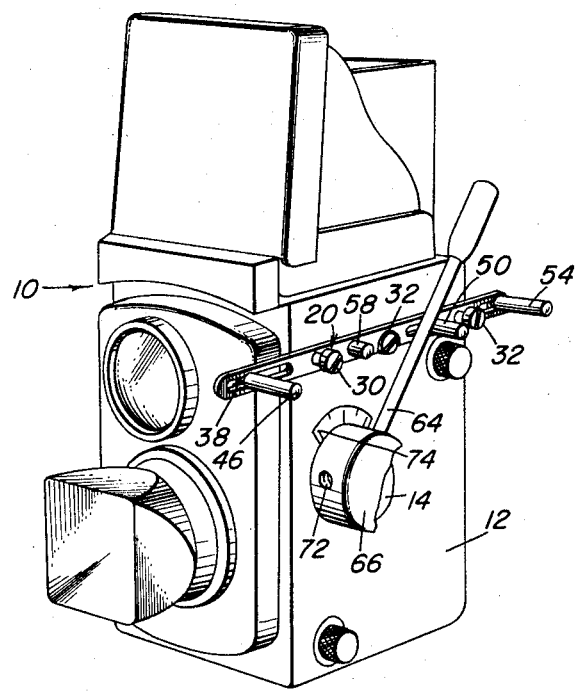
Figure 1 is a perspective view of a standard camera to which the attachment has been applied.
Figure 3:
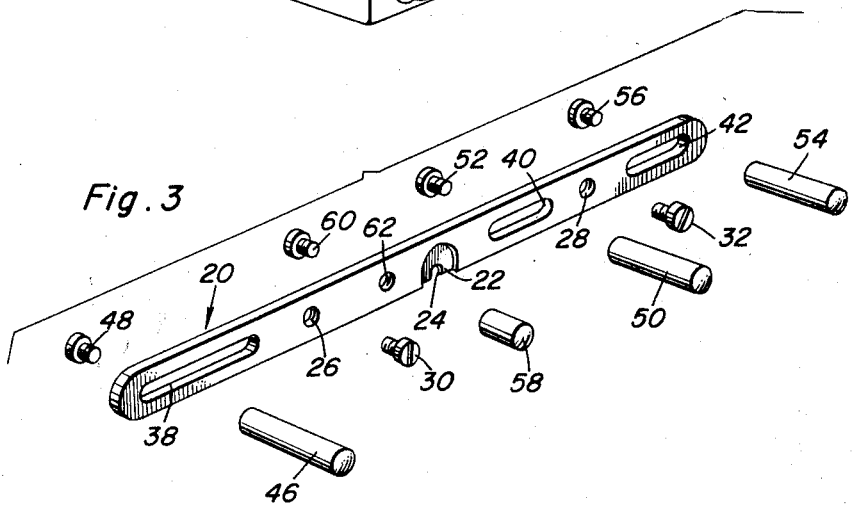
Figure 3 is a perspective view of a portion of the attachment.

The camera 10 is a standard make and includes in its case 12 a view finder together with a lens, the view finder and lens being mechanically coupled so that adjustment of the lens results in a corresponding adjustment of the view finder. In this way the image on the view finder screen varies in accordance with the lens adjustment.

A focus knob 14 on the case 12 is the external device ordinarily used for adjusting the focus of the camera 10. This knob drivingly connects the view finder adjusting mechanism with the lens adjusting mechanism and is standard part of the camera 10. A neck strap dowel 16 extends from the same side of the camera 10 as the knob 14. This dowel 16 is also original equipment and is used in part to support bracket 20 that constitutes a part of the attachment.

The attachment comprises bracket 20 which is made of lightweight metal. It is an elongated bar with an outwardly opening recess 22 in the face thereof between the ends. This recess has a semi-circular shape with a smaller recess 24 along the lower part thereof. Since dowel 16 has a head on it, the head fits in the larger recess 22 while the shank of the dowel 16 fits in the smaller recess 24. This holds the bracket attached firmly to the side of the camera.

A threaded aperture 26 is formed in the bar between the recess 22 and one end thereof. A threaded aperture 28 is in the bar between recess 22 and the opposite end of the bar. These apertures accommodate set screws 30 and 32 respectively, the latter coming to bear against the side of the camera 12. By tightening screws 30 and 32 the bracket is forced outwardly a very small distance near its ends from the camera side thereby binding the head of the dowel 16 against the bottom of the recess 22 and holding the bracket 20 firmly secured to the camera.

An elongated slot 38 parallel to the longitudinal axis of the bar is formed near one end thereof. Slightly shorter slots 40 and 42 are formed in the bar near the opposite end thereof and they are spaced from each other with the threaded aperture 28 therebetween. A first stop 46 is attached in registry with the slot 38. Stop 46 is preferably in the form of a peg having an internally threaded bore in order to accommodate the screw 48 which is passed through the slot 38. A second stop 50 is attached to the bar over slot 40 and is held in place by means of screw 52. This screw passes through slot 40 and is engaged with the threads of an axial bore in stop 50. A standby peg 54 which is usable as a stop is provided with a threaded bore in which screw 56 is attached. This screw passes through the slot 42 in holding the peg 54 fastened to the bracket. The final peg 58 is shorter than the other peg and functions as an indicator. It has an axial bore that is threaded in order to accommodate screw 60 which is passed through aperture 62 in the bracket 20.

A handle 64 is secured, as by being threaded, to the cylindrical wall 66 of a cap 68. This cap is fitted over knob 14 and held fixed to it by means of a pair of set screws 70 and 72 that are threaded in bores formed in the cylindrical wall 66. Therefore upon manipulation of the handle 64, the focus knob 14 is correspondingly rotated.

In operation after the attachment is applied to the camera 10, the distances to be photographed are estimated or determined in some other manner. Handle 64 is adjusted on the knob 14 and fastened thereto in the selected, adjusted position. The adjustment is made by determining the center distance which is to be photographed. This center distance is set on the camera focus adjusting knob 14 so that it is in alignment with the indicator peg 58. The handle 64 is so placed that it also is in alignment with this peg at the same setting of the knob 14. Accordingly, the photographer knows by feel of the peg 58 that when the handle 64 coincides with it his camera is focused to the center of the event.

Assume that this event is a boxing match where the contestants engage in the contest at a minimum distance of 6 feet and at a maximum distance of 20 feet. Stop 46 is adjusted by rotating it slightly to loosen it on its screw 48 and sliding the stop 46 together with screw 48 to such position that the footage indicator plate 74 indicates 6 feet with handle 64 being used as the pointer. Finally, the stop 50 is similarly adjusted in slot 40 with the handle 64 indicating 20 feet.

During the entire boxing event the photographer will be able to rapidly adjust the focus of his camera through the limits of 6 and 20 feet by moving handle 64 between the stops 46 and 50.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a camera case having a focus knob together with a headed neck strap dowel on the same side thereof as the focus knob, an attachment comprising a bracket, means formed in said bracket and engaged with said headed dowel for mounting said bracket on said camera case, stops carried by said bracket and spaced from each other, means adjustably securing said stops to said bracket, a handle, and means adjustably connecting said handle to said knob for moving said knob in response to movement of said handle, said handle extending between and being limited in its travel by said stops.

2. The attachment of claim 1 wherein there is an indicator secured to said bracket between said stops and with which to align said handle to provide a known reference point for said handle.

3. A camera attachment for use in a camera which has a camera case, view finder and a lens coupled together for simultaneous adjustment and a knob to cause this adjustment, a handle, means adjustably securing said handle to said knob so that after determination of a medial distance from the subject to the lens the focus knob may be adjusted to the medial distance and said handle secured to said knob in that position, an indicator with which said handle is alignable when in the position corresponding to the medial position for photographing, means securing said indicator to said camera case, a pair of stops, and adjustable means connected to said securing means for mounting said stops on opposite sides of said handle to limit the rotary travel of said handle, said stops being positionable at points corresponding to the minimum and maximum distances from the subject to the lens.

4. A camera attachment comprising a bracket, means for mounting said bracket on a camera, adjustable stops carried by said bracket and spaced from each other, a handle located between said stops, means adjustably securing said handle to a focus adjusting element of said camera whereby said handle is limited in its travel between the adjustable stops, an indicator carried by said bracket and located between said stops and adapted to align with said handle to indicate a medial position between the farthest and closest portions of the field to be photographed.

5. The attachment of claim 4 wherein the means for attaching said bracket to the camera includes a recess at approximately the center of said bracket, and set screws on each side of said recess adapted to abut a part of the camera case.

6. The attachment of claim 4 wherein said bracket is provided with an additional stop that is selectively operable with one of the first mentioned stops, and means adjustably securing said additional stop to said bracket in the path of travel of said handle.

References Cited in the file of this patent

UNITED STATES PATENTS

| | | |
|---|---|---|
| 1,037,721 | Bornmann et al. | Sept. 3, 1912 |
| 2,196,097 | Brown | Apr. 2, 1940 |
| 2,494,237 | Golkoski | Jan. 10, 1950 |
| 2,572,729 | Jackson et al. | Oct. 23, 1951 |